United States Patent
King et al.

(10) Patent No.: US 8,792,163 B2
(45) Date of Patent: Jul. 29, 2014

(54) LOW ORDER ADAPTIVE OPTICS BY TRANSLATING SECONDARY MIRROR OF OFF-APERTURE TELESCOPE

(75) Inventors: William B. King, Rancho Palos Verdes, CA (US); Chungte W. Chen, Irvine, CA (US); Robert W. Byren, Manhattan Beach, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 550 days.

(21) Appl. No.: 12/410,772

(22) Filed: Mar. 25, 2009

(65) Prior Publication Data

US 2011/0228386 A1    Sep. 22, 2011

Related U.S. Application Data

(60) Provisional application No. 61/039,620, filed on Mar. 26, 2008.

(51) Int. Cl.
*G02B 23/00* (2006.01)

(52) U.S. Cl.
USPC .......................................................... 359/399

(58) Field of Classification Search
USPC ......... 359/399, 811, 813, 822–826, 871–873, 359/846, 849
See application file for complete search history.

(56) References Cited

U.S. PATENT DOCUMENTS

| 5,229,889 | A | | 7/1993 | Kittell |
| 5,363,235 | A | * | 11/1994 | Kiunke et al. ................ 359/365 |
| 5,526,181 | A | | 6/1996 | Kunick et al. |
| 6,018,424 | A | | 1/2000 | Morgan et al. |
| 6,022,114 | A | * | 2/2000 | Foo ................................ 359/853 |
| 6,278,100 | B1 | | 8/2001 | Friedman et al. |
| 6,392,825 | B1 | | 5/2002 | Trunz et al. |
| 7,775,665 | B2 | * | 8/2010 | DellaVecchia et al. ........ 351/246 |
| 2003/0011073 | A1 | | 1/2003 | Shinogi et al. |
| 2003/0206350 | A1 | * | 11/2003 | Byren et al. ................... 359/613 |
| 2006/0022115 | A1 | | 2/2006 | Byren |
| 2007/0097473 | A1 | * | 5/2007 | Oshima et al. ................ 359/198 |
| 2008/0042042 | A1 | | 2/2008 | King et al. |

OTHER PUBLICATIONS

International Search Report for International Application No. PCT/US2009/038369 dated Sep. 2, 2009.

Tyson et al. "Adaptive Optics", Emerging Systems and Technologies: The Infrared and Electro-Optical Systems Handbook, vol. 8, Ann Arbor, MI., 1963, Chapter 2, pp. 165-169.

(Continued)

*Primary Examiner* — Stephone B Allen
*Assistant Examiner* — Tamara Y Washington

(57) ABSTRACT

In one or more embodiments, a beam control apparatus and method for correcting aberrations include an off-aperture telescope configured to receive a beam of electromagnetic energy, wherein the telescope includes a first optical element and a second optical element. The second optical element is configured to be translated in three orthogonal axes, and a wavefront error sensor is configured to detect aberrations in the beam and to provide a wavefront error signal in response thereto. A processor is configured to provide a correction signal in response to the wavefront error signal, and an actuator is coupled to the second optical element and configured, in response to the wavefront error signal, to selectively translate the second optical element in one or more of three substantially orthogonal directions corresponding to the three orthogonal axes.

21 Claims, 9 Drawing Sheets

(56) References Cited

OTHER PUBLICATIONS

Golnik "Directed Energy Systems", Emerging Systems and Technologies: The Infrared and Electro-Optical Systems Handbook, vol. 8, Ann Arbor, MI., 1963, Chapter 5, pp. 403-407.

Communication pursuant to Article 94(3) EPC dated Mar. 21, 2013 in connection with European Patent Application No. 09 723 630.1.
Office Action dated Mar. 4, 2014 in connection with Israel Patent Application No. 207082.

\* cited by examiner

OPD errors in excess of 100 waves are generated by deliberately introducing large angular misalignments into the secondary mirror.

Aberration of the misaligned Mersenne telescope has now been totally compensated by linear xyz displacements of the secondary mirror

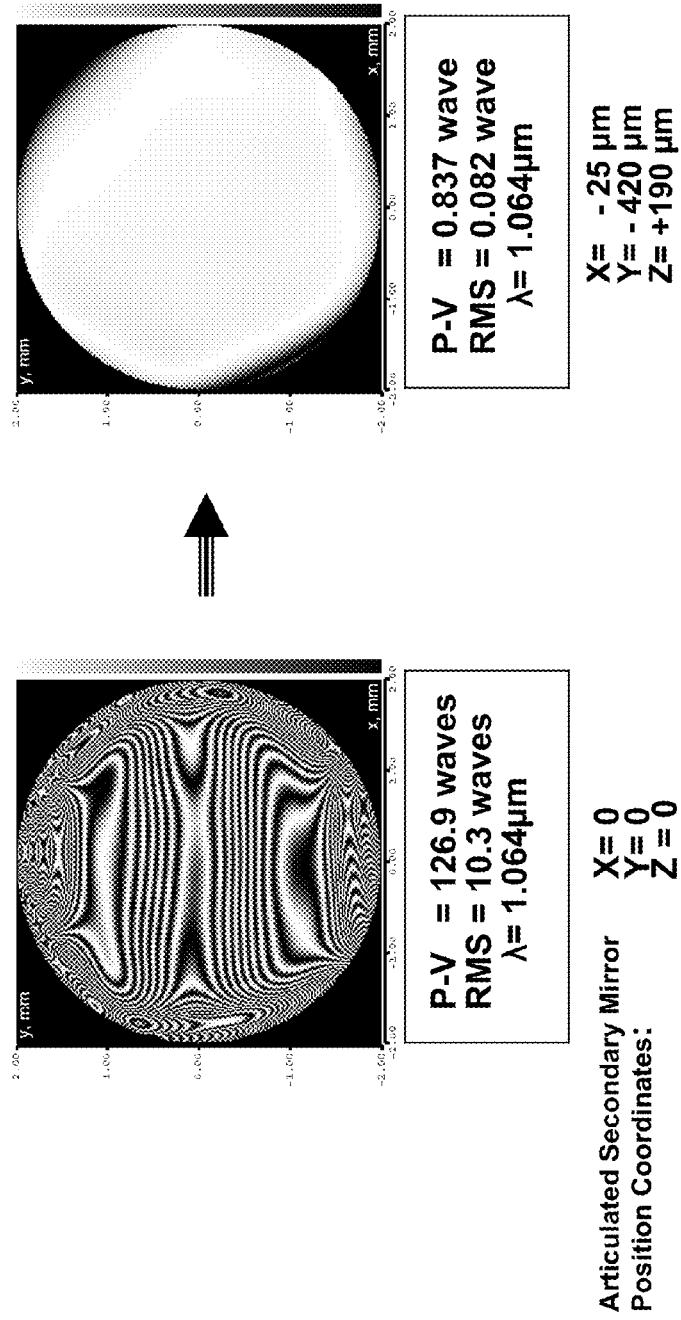
Figure 8. The interferograms show the results of using Articulated Secondary Mirror to correct low-order external aberrations of an input beam from P-V 126.9 waves down to 0.837 wave. The Off-Aperture (Off-Axis) Mersenne Telescope used for this laboratory demonstration has a 2.75" diameter F/0.7 Primary Mirror, with magnification factor of 6.2x.

LOW ORDER ADAPTIVE OPTICS BY TRANSLATING SECONDARY MIRROR OF OFF-APERTURE TELESCOPE

CROSS-REFERENCE TO RELATED APPLICATIONS

This application claims benefit from U.S. Provisional Application No. 61/039,620 filed on Mar. 26, 2008, incorporated herein by reference in its entirety, under 35 U.S.C. §119(e).

BACKGROUND

This disclosure relates generally to the field of optics and, more specifically, to systems and methods for correcting high-power beams of electromagnetic energy.

High power lasers are being considered for a variety of industrial, commercial, and military applications, including materials processing, satellite imaging, target tracking and identification, and directed energy weapons (DEW). Laser DEW systems generally involve the use of a high energy laser (HEL) to irradiate and destroy a target. To achieve performance objectives, many of these applications require that the laser beam be accurately steered and optimally focused. Steering involves line-of-sight control while focusing involves wavefront error correction.

Atmospheric turbulence produces density variations in the air that cause optical pathlength differences across a given beam path. The result is an optical distortion (or aberration) that reduces the average intensity of a focused laser beam due to beam spreading and causes spatial and temporal fluctuations in the beam due to scintillation. For many high power laser applications, it is advantageous to correct for the turbulence-induced aberration by pre-distorting the laser beam with the phase conjugate of the pathlength-integrated phase distortion (optical pathlength difference).

Traditional laser beam control adaptive optic (AO) systems use one or more multi-actuator deformable mirrors (DMs) in the beam path to correct for the wavefront aberrations caused by atmospheric turbulence. The conventional deformable mirror is typically a large element with a thin face sheet and a number of piezoelectric actuators. The outer surface of the face sheet is typically coated to be reflective for wavelengths of interest and is configured in the adaptive optical system as a mirror surface. Actuators are located behind the face sheet and are electrically driven to push and pull on the surface thereof to effect the deformation required to correct wavefront errors in an outgoing beam.

Astronomical telescopes routinely use DMs for atmospheric correction. Deformable mirrors may provide low and high spatial order correction. Two deformable mirrors may be employed in the same beam path to correct for both large-amplitude, low-frequency (temporal) and small-amplitude, high-frequency errors, respectively ("woofer/tweeter" arrangement).

However, deformable mirrors are difficult and expensive to manufacture and require a high throughput processor, called a real-time reconstructor. The real-time reconstructor is needed to calculate the actuator commands required to properly shape the mirror facesheet for optimal wavefront correction.

Previous attempts at achieving the "woofer" function have employed a full five degrees of freedom motion system to achieve the precision required for the desired degree of wavefront correction. These include U.S. Patent Publication No. 2003/0206350 A1 entitled "Low-Order Aberration Correction Using Articulated Optical Element" to Byren et al., U.S. Pat. No. 5,229,889 to Kittell, U.S. Patent Publication No. US 2003/0011073 A1 to Shinogi et al., and U.S. Pat. No. 6,278,100 B1 to Friedman et al. In particular, Friedman et al. discloses a rigid secondary mirror configured within an on-aperture (centrally obscured) Cassegrain telescope, the secondary mirror being articulated in multiple degrees of freedom with at least two actuators. The configuration of the actuators, as shown in the drawing, is such that the mirror will not translate in a lateral (non-focus) direction without also rotating.

Hence, a need exists in the art for an improved system or method for effecting aberration correction of a high power laser beam which is less expensive and less complex than conventional approaches.

SUMMARY

In accordance with various embodiments of this disclosure, a beam control apparatus for correcting aberrations includes an off-aperture telescope configured to receive a beam of electromagnetic energy, wherein the telescope includes a first optical element and a second optical element, wherein the second optical element is configured to be translated in three orthogonal axes; a wavefront error sensor configured to detect aberrations in the beam and configured to provide a wavefront error signal in response thereto; a processor configured to provide a correction signal in response to the wavefront error signal; and an actuator coupled to the second optical element and configured to selectively translate the second optical element in one or more of three substantially orthogonal directions corresponding to the three orthogonal axes in response to the wavefront error signal.

In accordance with various embodiments of this disclosure, a method for correcting aberrations in a beam control apparatus includes receiving a beam of electromagnetic energy using an off-aperture telescope, wherein the telescope includes a first optical element and a second optical element, wherein the second optical element is configured to be translated in three orthogonal axes; detecting aberrations in the beam using a wavefront error sensor and providing a wavefront error signal in response thereto; providing a correction signal to a processor in response to the wavefront error signal; and selectively translating the second optical element in one or more of three substantially orthogonal directions corresponding to the three orthogonal axes by an actuator in response to the wavefront error signal.

In general, this disclosure is intended to correct wavefront aberrations resulting from atmospheric turbulence, aerodynamic boundary layer aero-optic effects, and distortions in the beam director optics of a high energy laser beam control system, high quality imaging system, or long range laser communication system. In particular, this disclosure seeks to provide low-order (referring to Zernike polynomial decomposition and corresponding spatial frequency) correction where the amplitude or strength of the aberration exceeds the stroke limit of a typical continuous facesheet deformable mirror.

Moreover, in accordance with various aspects of the present disclosure, a beam-control apparatus including an off-axis telescope arrangement is disclosed, wherein the secondary mirror is translated and not rotated. Thus, the present disclosure recognizes that mirror rotation, while undesirable from a fine control sensitivity standpoint, is also unnecessary in achieving the same degree of wavefront correction.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

FIG. 8 is a plot of interferograms showing the results of using an articulated secondary mirror to correct low-order external aberrations of an input beam from P-V 126.9 waves down to 0.837 waves in accordance with an embodiment of the present disclosure.

DETAILED DESCRIPTION

Figure 1:
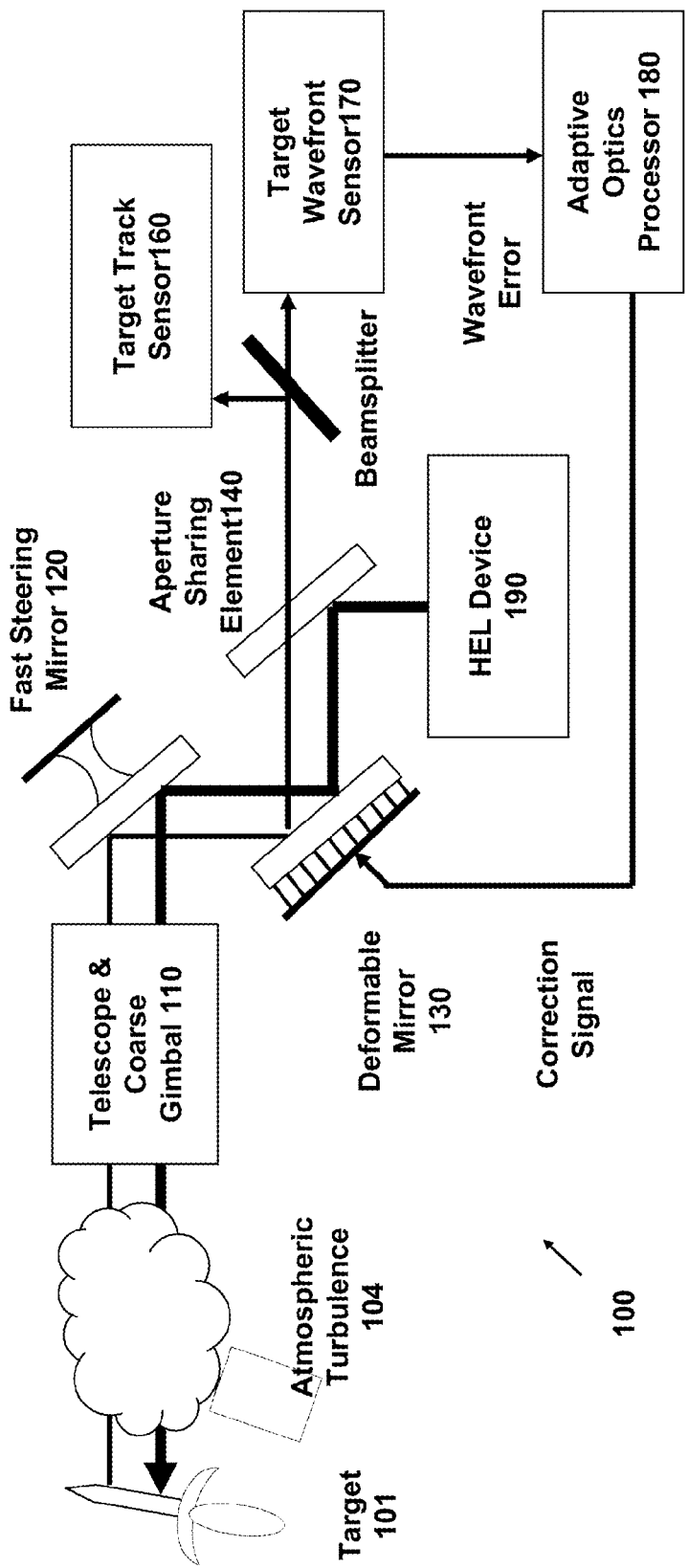
FIG. 1 is a simplified optical schematic of a conventional laser beam control architecture.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

A simplified optical schematic of conventional laser beam control architecture 100 is shown in FIG. 1. A beam director, generally consisting of a telescope and 2-axis coarse gimbal 110, is commanded to the line-of-sight of target 101 based on an external cue (acquisition or coarse tracking system not shown). Target track sensor 160 acquires the target and begins to close a track servo loop (not shown) maintaining line-of-sight to target 101. Optical aberrations along the line-of-sight caused by atmospheric turbulence 104 along the path to the target 101 distort the image of target 101, causing relatively poor tracking performance. Target wavefront sensor 170 measures this wavefront (or phase) distortion, and adaptive optics processor 180, which includes a high throughput real-time reconstructor, closes an adaptive optics servo loop around deformable mirror (DM) 130, effectively nulling the wavefront (or phasefront) error caused by the atmosphere. Target wavefront sensor 170 can employ an active sensor with a beacon illuminator (not shown) to measure either subaperture tilts (Shack-Hartmann sensor) or optical phase (lateral shearing interferometer or transform wavefront sensor). Target wavefront sensor 170 can also employ imaging sensors at different focal positions (conjugate planes) to infer phase from the passive target imagery using "phase diversity" techniques. The AO loop corrects the aberrations along the target path allowing the tracker to operate at full performance. It also corrects the portion of the beam path for laser device 190 from aperture sharing element (ASE) 140 to target 101, enabling high instantaneous beam intensity (high Strehl ratio), and low beam wander (low angular jitter) on target 101.

Fast steering mirrors 120 may be used in conjunction with a stable platform and internal active auto-alignment system (not shown) to provide wide temporal bandwidth correction for line-of-sight disturbances caused by imperfect isolation of base motion, structural compliance, gimbal bearing runout, and gimbal axis non-orthogonality. Fast steering mirror 120 can also be used to off-load high temporal frequency tilt corrections from DM 130, thereby minimizing the stroke requirement of the DM actuators.

A second DM, often called a "woofer DM" (not shown) can be used to off-load low-frequency, large-amplitude (long-stroke), and low-order aberrations from the first DM. In this arrangement, the first DM, called a "tweeter," would be designed for limited stroke, but would operate with a high temporal bandwidth and have a large number of actuators to accommodate high-order corrections.

In this context, frequency refers to the speed at which DM actuators must be driven to correct the changes in the distorted optical wavefront. Amplitude refers to the physical displacement of the DM actuators from the nominal position to accommodate the peaks and valleys in the distorted wavefront. Amplitude or stroke is typically measured in the number of wavelengths associated with the peak distortion. "Order" refers to the highest order of Zernike polynomials in a decomposition of the distorted wavefront that must be corrected in order to achieve a given residual wavefront error after correction. For example, if the first 32 Zernike orders need to be used to correct the input wavefront in order to effect a prescribed residual wavefront error of <0.1 waves rms, then the spatial order of the aberration is 32.

The theory of operation and description of key components for a conventional HEL beam control system are known, and may be found in several published references including Tyson and Ulrich, "Adaptive Optics", The Infrared and Electro-Optical Handbook, Volume 8, Chapter 2, ERIM, Ann Arbor, Mich., pp. 165-237, (1993) and Golnik, "Directed Energy Systems", The Infrared and Electro-Optical Handbook, Volume 8, Chapter 5, ERIM, Ann Arbor, Mich., pp. 403-480, (1993), both hereby incorporated by reference.

However, the conventional approach identified in these publications suffers from several limitations. In particular, while deformable mirrors provide good low and high order correction, they are difficult and expensive to manufacture, and they require a high throughput processor, called a real-time reconstructor, to calculate the actuator commands that properly shape the mirror facesheet for best wavefront correction.

In many applications it may not be necessary to correct for both low and high order aberrations. For instance, in an application that addresses barrage artillery attacks of hundreds of mortars and tactical rockets which must be engaged at high look-up angles, atmospheric turbulence induced wavefront errors are primarily low spatial order. For such applications, a low cost, low-order aberration control system may be preferable to a full high-order adaptive optics system with expensive deformable mirrors and real-time reconstructor elements. Low-order correction would be particularly effective when used with certain laser weapons, wherein the high energy laser device has uncorrected high-order wavefront errors in the raw beam, as may be the case with high energy solid-state laser resonators incorporating intracavity low order adaptive optics. In this case, using external high-order atmospheric correction may not be very effective in increasing the beam intensity on target, because the residual high-order wavefront error in the raw laser beam may dominate.

Embodiments of this disclosure obviate the need for the deformable mirror and associated real-time reconstructor processor by performing low-order wavefront correction, for example, by articulating the secondary mirror of the beam director telescope in one or more degrees-of-freedom using one or more actuators. This approach provides focus, astigmatism, and to a lesser extent coma correction of the HEL beam, which likely may be the primary aberrations in many future demanding applications. A high-order adaptive optic solution employing DMs and complex reconstructors may be too expensive for certain missions and may not be a good match to the performance requirement and HEL raw laser beam quality.

Figure 2:
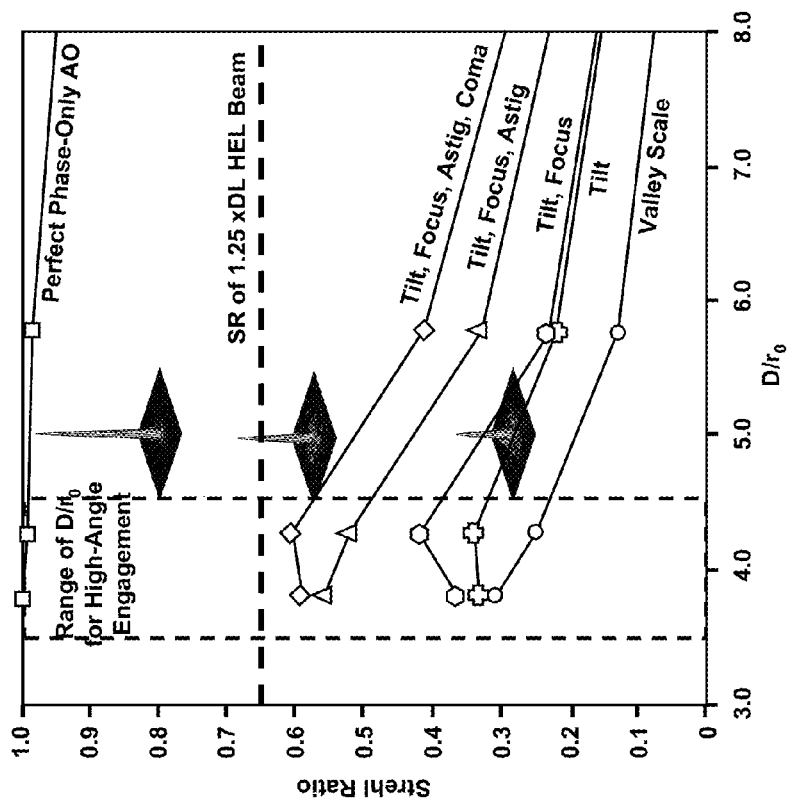
FIG. 2 is a graph showing the Strehl ratio of a laser beam propagating through the atmosphere as a function of $D/r_0$ for perfect phase-only adaptive optics and varying degrees of low-order adaptive optic correction.

Adaptive optics used to correct for turbulence-dominated beam spreading has been found to be desirable. Propagation analyzes were conducted and it was concluded that for the high-angle engagements, typical of the stressing mortar and rocket attack scenarios (first volley in artillery attack), correction of only the low-order aberrations (i.e., tilt, focus, astigmatism and coma) provides a Strehl ratio improvement that is within 60% of the performance achievable with perfect phase-only adaptive optics, as shown in FIG. 2. This result is notable in that it indicates the potential for achieving high intensity on target with modest beam control complexity and at an affordable cost.

FIG. 2 is a graph showing Strehl ratio as a function of $D/r_0$ for perfect phase-only adaptive optics and varying degrees of low-order adaptive optic correction, given a specific air defense HEL scenario. The $D/r_0$ term is a dimensionless parameter that is the ratio of beam director exit aperture (D) to the lateral correlation length ($r_0$), which is indicative of the strength of atmospheric distortion that must be corrected for a given beam control system. Plots of beam intensity on target are inserted for reference, given $D/r_0$ of 4.25 which corresponds to an 80 degree elevation angle and 5 km range to target, for the perfect AO, low-order AO (tilt, focus, coma and astigmatism corrected), and tilt-only correction. A region of interest for tactical applications is shown between the vertical dashed lines, corresponding to $D/r_0$ values between 3.5 and 4.5.

Low-order correction is particularly attractive when combined with a locally-corrected HEL beam employing low-order adaptive optics. The Strehl ratio associated with an HEL beam with a raw beam quality that is 1.25 times the diffraction limit (DL), assuming zero atmospheric turbulence, is shown as a horizontal dashed line on the graph in FIG. 2 to indicate the performance limit for such a laser. Note that the Strehl ratio for a perfect raw beam that is corrected for atmospheric tilt, focus, astigmatism, and coma is of the same order as the Strehl ratio for a 1.25×DL raw HEL beam, indicating that a higher-order correction for such a beam may produce diminishing returns. Furthermore, a full-AO target loop correction approach based on high order deformable mirror correction would be expensive and may be very difficult to support logistically in a stressing tactical battlefield environment.

Intracavity AO correction scheme presently being used in some solid-state lasers for local-loop beam cleanup may provide best correction of the low-order wavefront errors in the raw HEL beam, thereby enhancing the effectiveness of low-order AO target-loop correction. Conversely, the intrinsic, uncompensated higher order aberrations in the HEL beam may dominate (and thereby diminish the effectiveness of) the high-order corrections that a full-AO target loop approach would apply, the result being less than ideal correction and reduced Strehl. Furthermore, a full-AO target loop correction approach based on active beacon illumination, sub-aperture tilt sensing using Shack-Hartmann arrays, matrix-multiply real-time reconstruction, and high-order deformable mirror correction would be very expensive and may be very difficult to support logistically in a stressing tactical battlefield environment.

In severely aberrated environments, such as found in aerodynamic boundary layer surrounding high performance aircraft with protruding turrets, the amplitude of the wavefront errors may exceed the stroke limits of conventional deformable mirrors. Under these conditions, a secondary wavefront control element may be used in conjunction with the wide bandwidth, short-stroke, high Zernike order DM to offload the large displacement disturbance modes, which tend to be lower temporal frequency and lower spatial order. A single wavefront sensor, such as a Shack-Hartmann sensor, may be used in this architecture to measure the wavefront disturbance, and a crossover network may be used to send the low-frequency portion of the disturbances to the "woofer" element, and send the high-frequency portion of the disturbance to the "tweeter" DM. A conventional Shack-Hartmann sensor, however, may not have sufficient dynamic range to measure the severe subaperture wavefront tilts while preserving the precision necessary for accurate high-order correction. Under these conditions, it may be advantageous to use a separate wavefront sensing element that has adequate dynamic range, thereby allowing the "woofer" element to bring the wavefront error within the correctable range of the high-order Shack-Hartmann sensor. For this architecture, it is desirable to minimize the complexity and cost of both the "woofer" element and the low-order, large dynamic range wavefront sensor.

Figure 3:
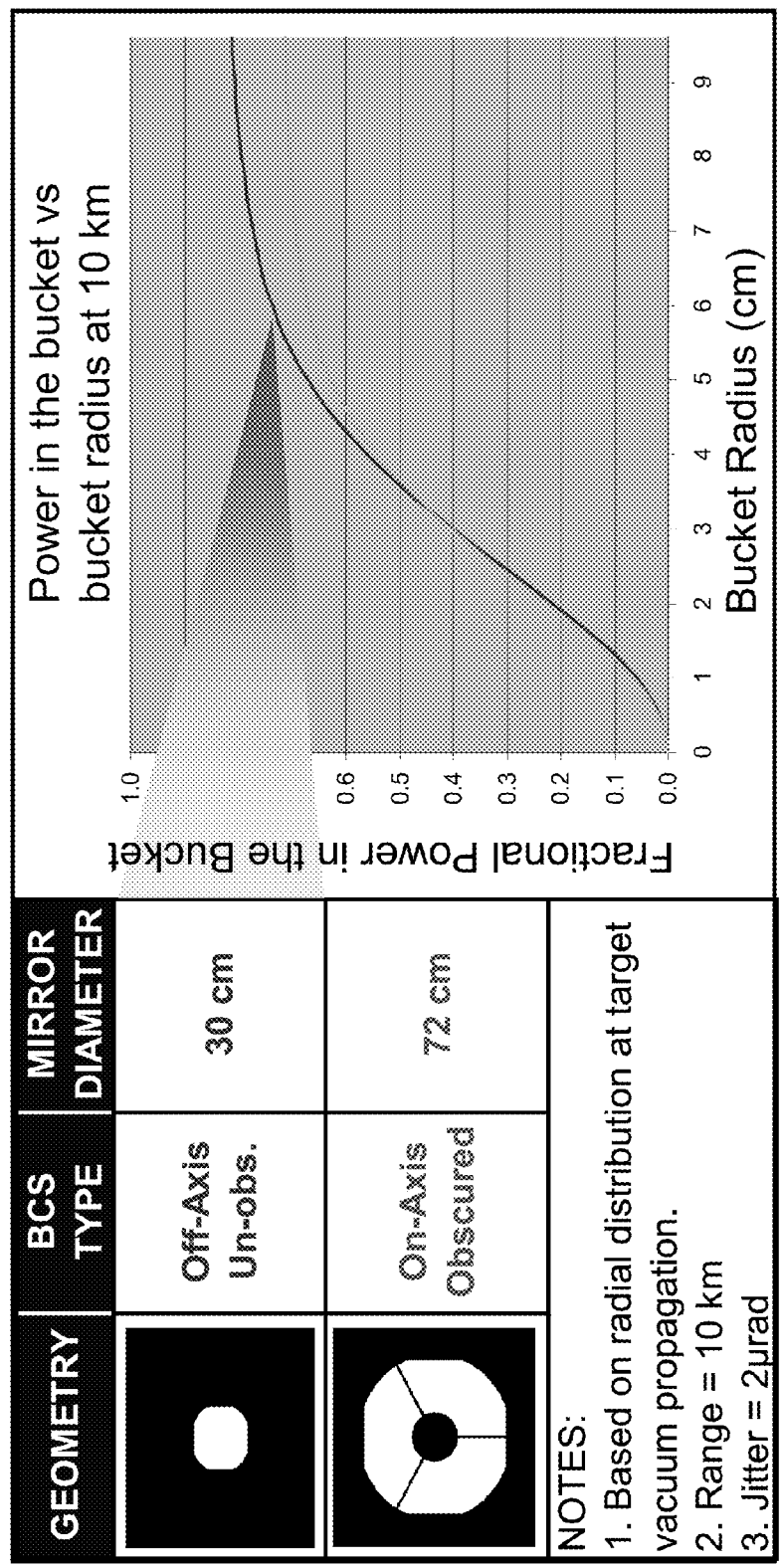
FIG. 3 shows the power-in-the bucket associated comparison of on-aperture versus off-aperture beam directors.

The off-aperture telescope form (off-axis unobscured) of the present disclosure is advantageous for a high energy laser beam director in that it achieves more "power-in-the-bucket" at a given range than an "on-aperture" form (on-axis obstructed) with a central obscuration due to diffraction. FIG. 3 shows that a 30 cm diameter off-aperture beam director achieves the same power in a 3.2 cm radius bucket at a range of 10 km as a 72 cm on-aperture beam director, i.e., 2.4 times as big. The smaller aperture size of the "off-aperture" telescope as compared to the on-aperture form provides size, weight, cost, aerodynamic drag, and low observability advantages for high energy laser applications.

Figure 4:
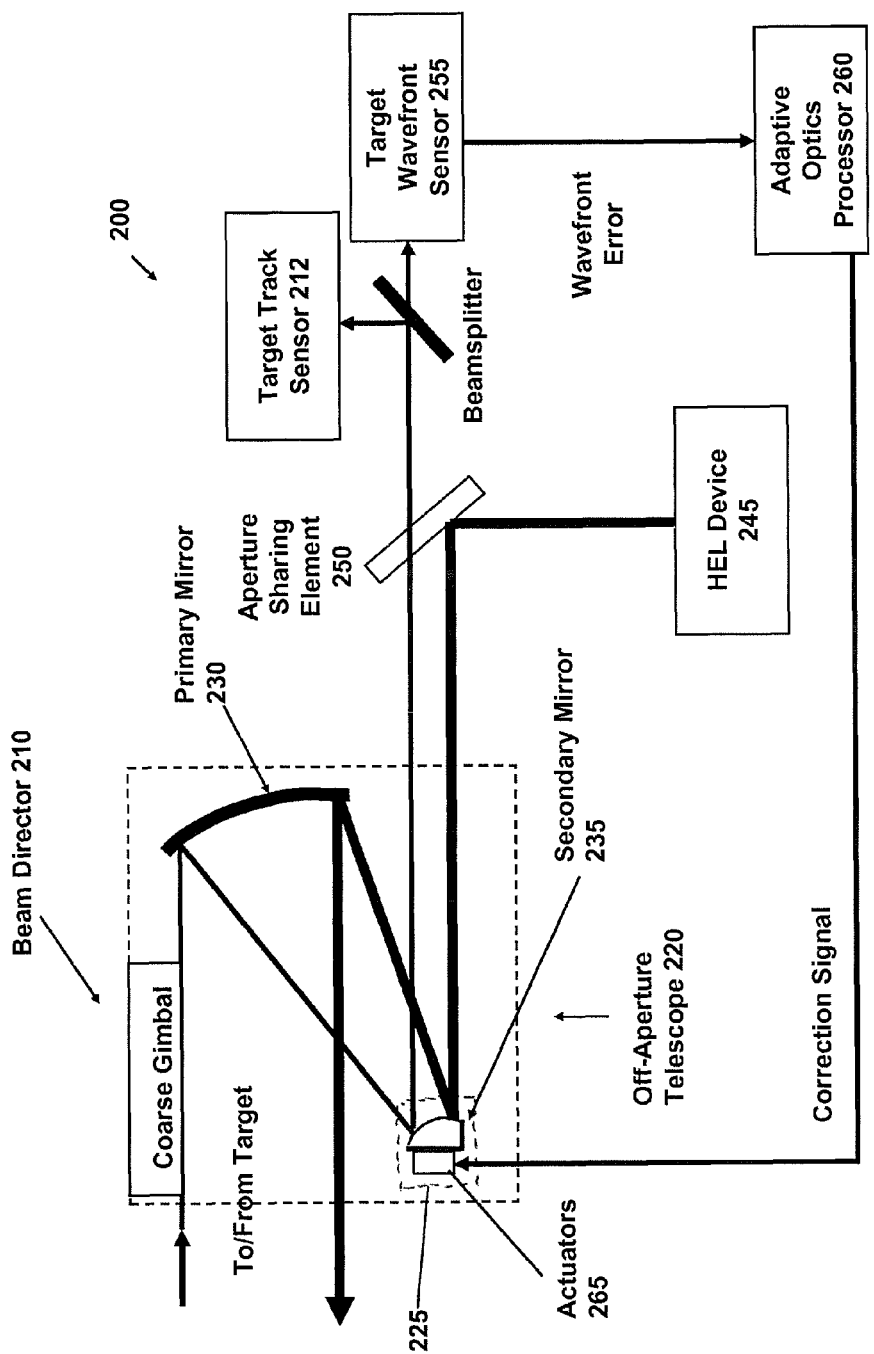
FIG. 4 is an optical schematic of an illustrative embodiment of a beam control architecture in accordance with an embodiment of the present disclosure.

FIG. 4 is an optical schematic of an illustrative embodiment of beam control architecture 200 in accordance with an aspect of the present disclosure. In this aspect, the off-aperture telescope with translatable secondary mirror can be used as a primary wavefront correction mechanism for a low-order adaptive optics system embodiment, applicable, for example, for ground and mobile high energy laser beam control systems used to counter rockets, artillery and mortars at higher elevation angles. It can be used as the "woofer" part of a two (or more) stage "woofer/tweeter" arrangement with conventional deformable mirrors. Inventive beam control architecture 200 employs many of the same features as the conventional beam control architecture described above. HEL beam director 210 is commanded to the line-of-sight of a target based on an external cue from target track sensor 212. Beam director 210 includes off-aperture telescope 220 and 3-axis translation stage 225. In an aspect of the disclosure, telescope 220 includes first optical element 230 and second optical element 235. Optical elements 230 and 235 can include refractive elements, such as lens, or reflective elements, such as mirrors, or both. Telescope 220 can include additional optical elements as would be apparent.

Beam director telescope 220 expands the raw HEL beam from high energy laser device 245. Aperture sharing element (ASE) 250 allows a single shared aperture to be advantageously used for both the low power track and/or wavefront sensors and the high power output laser beam, ensuring that the path through the atmosphere taken by the high power beam is the same as that taken by the wavefront sensor, and that the correction applied to the shared atmospheric path will pre-distort the high-power beam as required to deliver irradiance on target approaching that of an undistorted atmospheric path.

Target wavefront sensor 255 is configured to measure distortions of the wavefront from the target due to distortions in the atmosphere. Adaptive optics processor 260 is configured to receive data from target wavefront sensor 255 to provide a correction signal. One or more actuators 265 on 3-axis translation stage 225 are attached to the second optical element and configured to translate the second optical element in three substantially orthogonal directions corresponding to the three orthogonal axes in response to the wavefront error signal.

Figure 5:
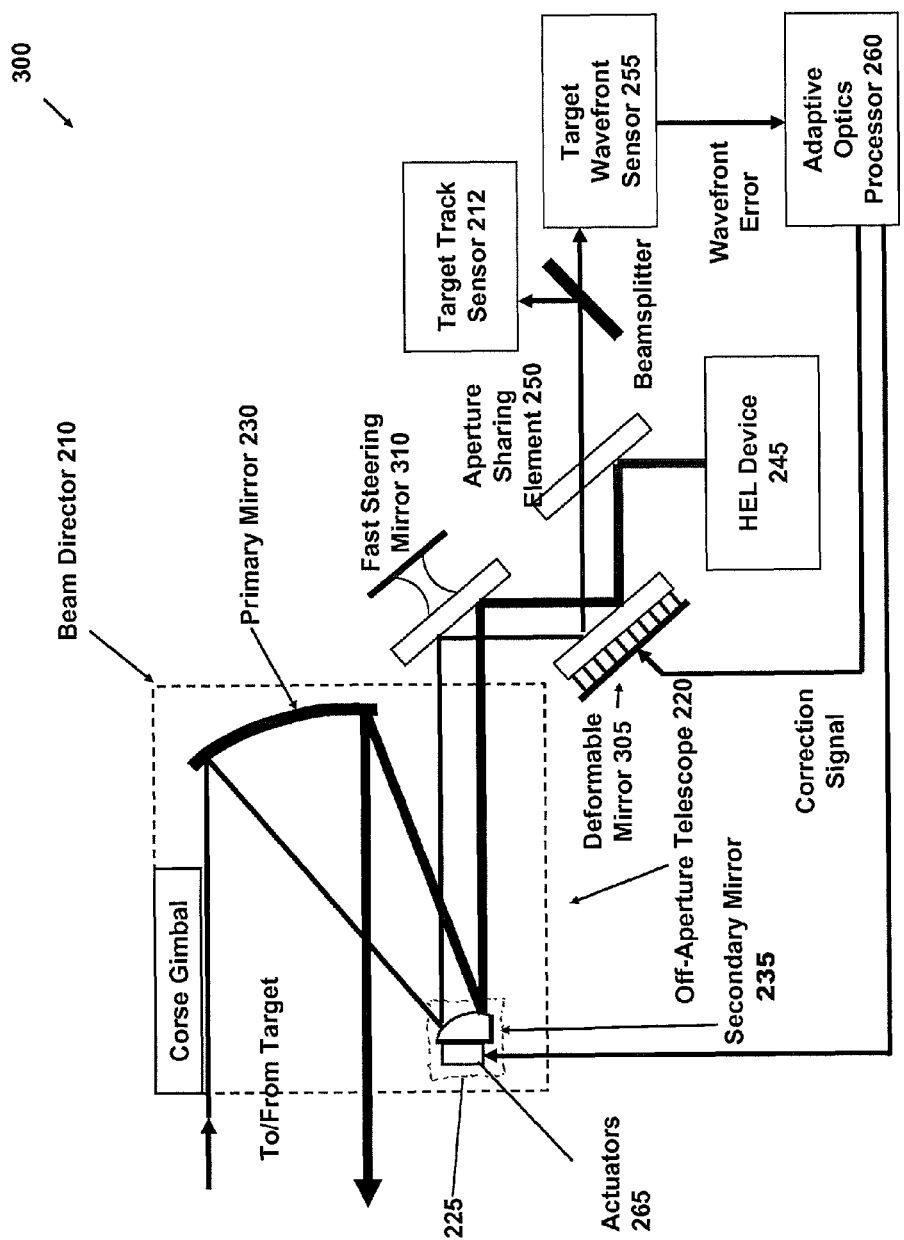
FIG. 5 is an optical schematic of another illustrative embodiment of a beam control architecture of the present disclosure.

FIG. 5 is an optical schematic of an illustrative embodiment of beam control architecture 300 in accordance with an embodiment. In particular, FIG. 4 shows a woofer-tweeter configuration of beam control architecture 300. The "woofer/tweeter" embodiment is applicable, for example, to airborne high energy laser beam control systems with severe aero-optic distortions caused by the turbulent aerodynamic boundary layer. In this particular configuration, deformable mirror 305 and fast steering mirror 310 are arranged between telescope 220 and HEL device 245.

Radiation to/from a target is intercepted by first optical element 230 of telescope 220 and directed to second optical element 235. Second optical element 235 is mounted on 3-axis translation stage 225. Radiation from second optical element 235 is directed to fast steering mirror 310 and then onto deformable mirror 305. Radiation from deformable mirror 305 is transmitted through aperture sharing element 250 and is measured by target track sensor 212 and target wavefront sensor 255. Adaptive optics processor 260 generates and transmits a correction signal to deformable mirror 305 and to 3-axis translation stage 225. Deformable mirror 305 is configured to deform its reflective surface by way of a plurality of actuators in response to the corrected signal. Three-axis translation stage 225 is configured to translate the second optical element in three degrees of freedom along three orthogonal axes by way of one or more actuators 265. HEL device 245 is configured to direct the high energy laser beam through telescope 220 by way of deformable mirror 305 and fast steering mirror 310.

In, addition, one or more fast steering mirrors may be used to compensate for atmospheric tilts and reduce misalignment errors in the internal beam path caused by structural compliance, gimbal bearing runout, gimbal axis non-orthogonality, and base motion disturbances (coupled through stiction/friction in the gimbal bearings).

Figure 6:
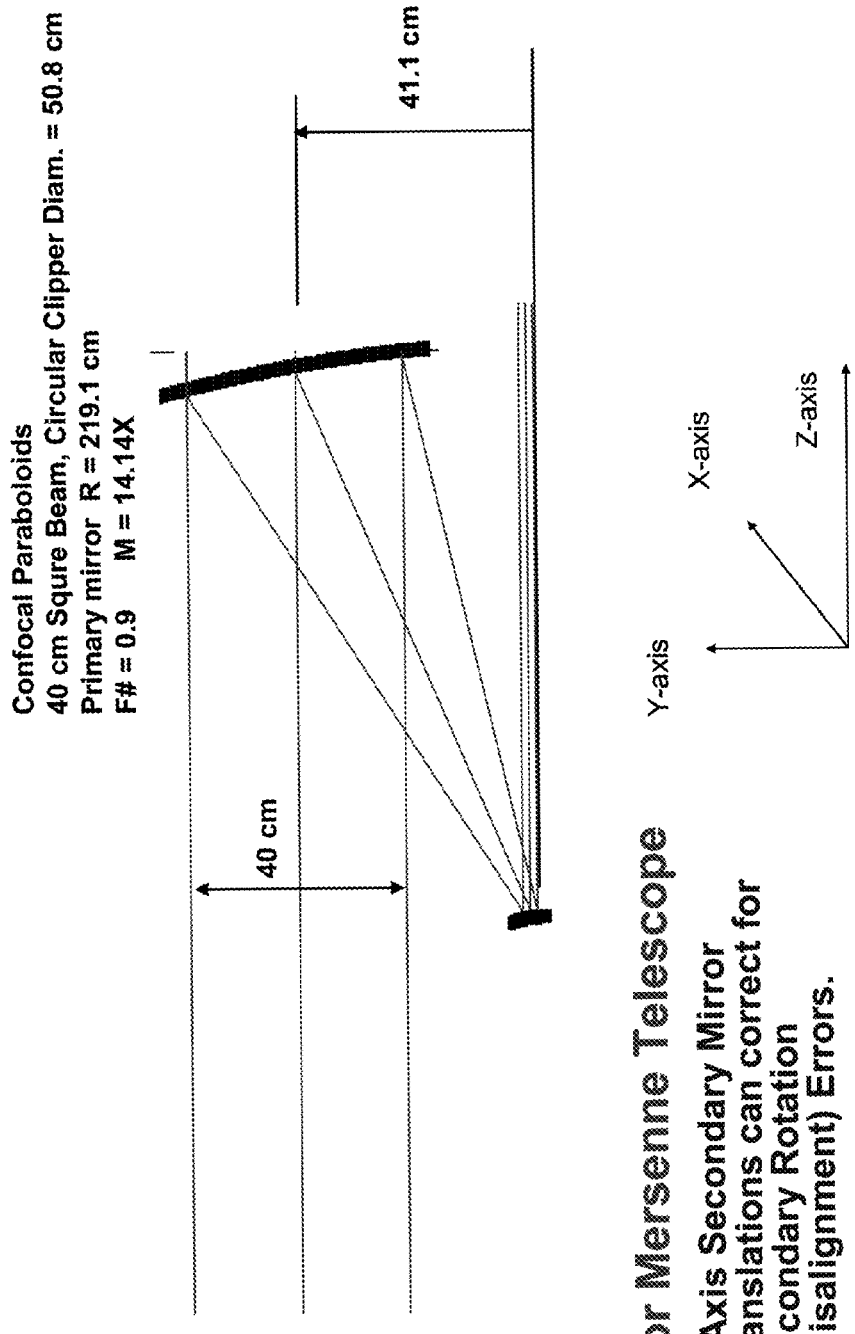
FIG. 6 shows an optical ray-trace computer simulation in accordance with an embodiment of the present disclosure.

FIG. 6 shows an optical ray-trace computer simulation for a f/0.9 Mersenne (confocal paraboloid) telescope optical form, which is a typical optical form for a large off-aperture reflective beam expander. As shown, a 2.83 cm square radiation beam is incident on a secondary mirror. By way of a non-limiting example, the primary mirror has a radius of curvature of 219.1 cm and the telescope has a magnification of 14.14. The radiation beam is reflected off the secondary mirror onto a primary mirror. By way of a non-limiting example, the secondary mirror can be translated along three-axes in three different directions by one or more actuators to correct for telescope distortions (e.g., relative mirror motion due to metering structure thermal expansion and structural compliance under shock/vibration load), misalignment errors, and atmospheric wavefront errors.

Table 1 shows the results of a ray trace analysis. In Case 1, the secondary mirror was misaligned by simultaneously introducing a 100 microradian (μr) rotation about the z-axis and a 200 μr rotation about the x-axis. For this case, a 0.0019" displacement of the secondary mirror in the x-axis direction was found to be adequate to compensate for rotational misalignments. In Case 2, a more severe angular misalignment was introduced (10 milliradians (mr) about the z-axis and 20 mr about the x-axis) and, again, this misalignment was compensated by translating the secondary mirror by 0.1857" in the x-axis, 0.0017" in the y-axis, and 0.0015" in the z-axis. As a result of the simulation, large, low-order aberrations resulting from optical misalignment of the mirrors of an off-aperture reflective telescope were found to be correctable by small linear movements along the three axes (x, y, and z) of the secondary mirror of the telescope. Moreover, two of the five degrees-of-freedom possible in articulating the secondary mirror of a telescope (namely, x- and z-axis rotation) were found to be redundant, and tend to provide no benefit in aberration correction over the three degrees of translation. Further, the precision required of a translation stage for the secondary mirror was found to be on the order of 0.0001" which is within the capability of existing piezoelectric motion systems. This is particularly significant, given the very fast f/# of the telescope. The dynamic range of the translation stage is of the order of 40 dB, which is also within current capabilities.

TABLE 1

Ray trace analysis of angular misalignment correction with translated secondary mirror

| Case # | Secondary mirror misaligned by introducing rotations about x- and z- axis | resulting aberrations fully compensated by xyz displacements of secondary mirror |
| --- | --- | --- |
| 1 | 100 μR about z-axis<br>200 μR about x-axis | x displacement = 0.0019" |
| 2 | 10 mR (0.57°) about z-axis<br>20 mR (1.14°) about z-axis | x displacement = 0.1857"<br>y displacement = 0.0017"<br>z displacement = 0.0015" |

Figure 7A:
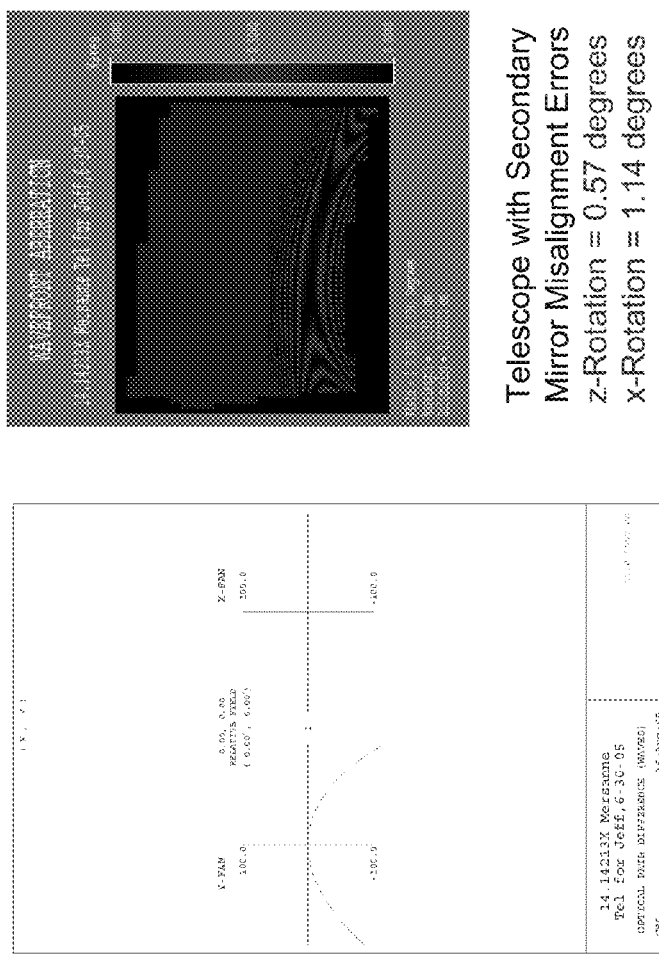
FIG. 7a shows a plot of wavefront errors for Case 2 of Table 1 in accordance with an embodiment of the present disclosure.
Figure 7B:
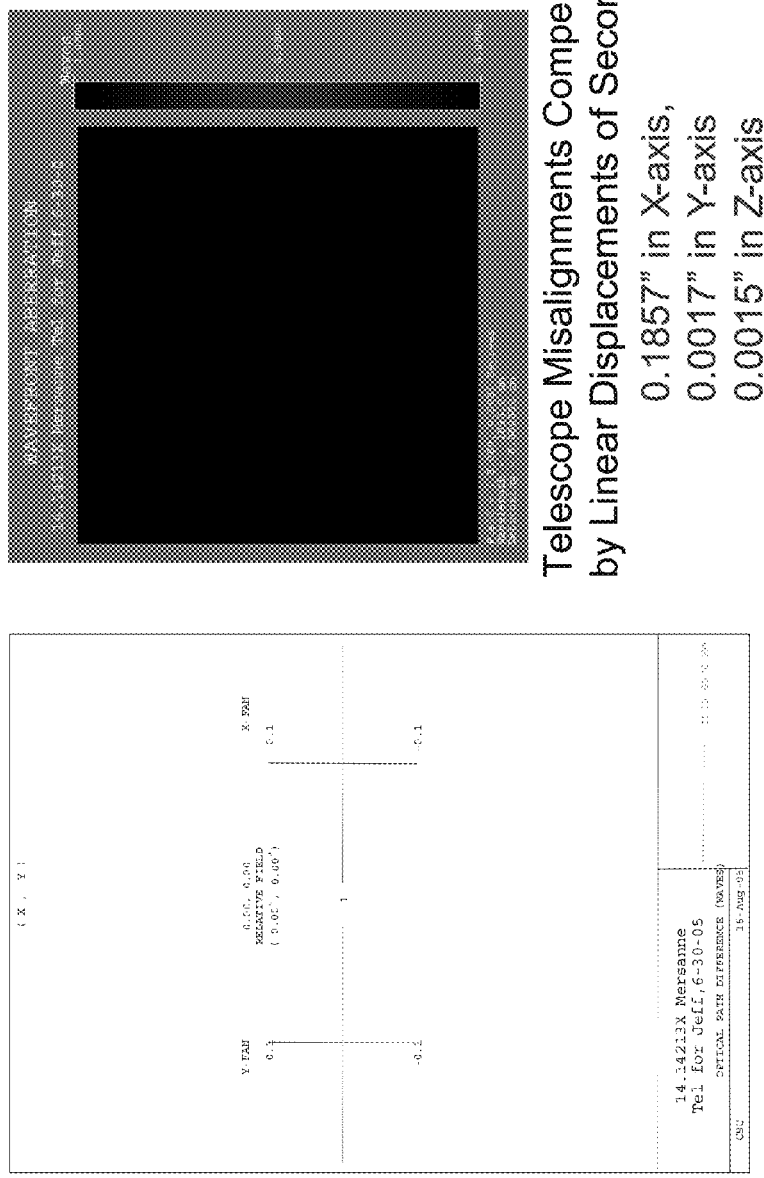
FIG. 7b shows a plot of aberration of the misaligned Mersenne telescope that has been compensated by linear xyz displacements of the secondary mirror for Case 2 of Table 1 in accordance with an embodiment of the present disclosure.

The wavefront errors for case 2 are plotted in FIG. 7. FIG. 7a shows the wavefront error (optical path length difference where one light-dark-light cycle is equivalent to one "wave" at the 1064 nm wavelength) associated with the 10 mr z-axis tilt and 20 mr x-axis tilt without correction. The peak-to-valley wavefront error across the telescope aperture was found to exceed 100 "waves" at the 1064 nm wavelength, which represents a very severe distortion. FIG. 7b shows the residual error after 3-D (xyz) linear translation of the secondary mirror. The outcome of this re-optimization was that the misaligned telescope is now nearly aberration free. The "uniform black" wave map indicates zero aberration of the re-optimized telescope. It should be noted that the aberration compensation is achieved without changing the angular misalignment state of the secondary.

FIG. 8 shows interferograms that are a result of using an articulated secondary mirror to correct low-order external aberrations of an input beam from P-V 126.9 waves down to 0.837 wave. The Off-Aperture (Off-Axis) Mersenne Telescope used for this laboratory demonstration has a 2.75" diameter F/0.7 Primary Mirror, with magnification factor of 6.2×.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A beam control apparatus for correcting aberrations, the beam control apparatus comprising:
    an off-aperture telescope configured to receive a beam of electromagnetic energy, wherein the telescope includes a first optical element and a second optical element, wherein the second optical element is configured to be translated in three orthogonal axes and be constrained from rotation around any of the three orthogonal axes;
    a wavefront error sensor configured to detect aberrations in the beam and configured to provide a wavefront error signal in response thereto;
    a processor configured to provide a correction signal in response to the wavefront error signal; and
    at least one actuator coupled to the second optical element and configured to selectively translate the second optical element in one or more of three substantially orthogonal directions corresponding to the three orthogonal axes in response to the wavefront error signal.

2. The beam control apparatus according to claim 1, wherein the telescope includes two conic mirrors.

3. The beam control apparatus according to claim 1, wherein the telescope comprises a Mersenne confocal paraboloid telescope.

4. The beam control apparatus according to claim 1, wherein the telescope includes a third optical element.

5. The beam control apparatus according to claim 4, wherein the third optical element comprise a steering mirror.

6. The beam control apparatus according to claim 5, wherein the first and second optical elements are mirrors and the second optical element receives the beam from the steering mirror, corrects at least some of the aberrations in the beam through translation in at least one of the orthogonal directions, and reflects the beam to the first optical element.

7. The beam control apparatus according to claim 1, wherein the electromagnetic energy is provided by a laser.

8. The beam control apparatus according to claim 1, wherein the first and the second optical elements each comprise a reflective surface.

9. The beam control apparatus according to claim 1, wherein the aberrations are caused by atmospheric turbulence or aerodynamic boundary layer aero-optical effects.

10. The beam control apparatus according to claim 1, wherein the at least one actuator comprises three actuators associated with a translational movement, each actuator configured to translate the second optical element in one of the three orthogonal directions without rotating the second optical element.

11. The beam control apparatus according to claim 1, wherein an output of the telescope is substantially free of spherical aberration, coma and astigmatism after the actuator selectively translates the second optical element in response to the wavefront error signal.

12. The beam control apparatus according to claim 1, wherein the off-aperture telescope comprise a three mirror afocal telescope.

13. The beam control apparatus according to claim 1, wherein the first and second optical elements are lenses.

14. The beam control apparatus according to claim 1, further comprising: a deformable optical element configured to receive the correction signal and deform at least part of the deformable optical element in response thereto.

15. The beam control apparatus according to claim 14, further comprising: a steering mirror configured to reflect radiation from the deformable optical element to the telescope.

16. A method for correcting aberrations in a beam control apparatus, the method comprising:
    receiving a beam of electromagnetic energy using an off-aperture telescope, wherein the telescope includes a first optical element and a second optical element, wherein the second optical element is configured to be translated in three orthogonal axes and be constrained from rotation around any of the three orthogonal axes;
    detecting aberrations in the beam using a wavefront error sensor and providing a wavefront error signal in response thereto;
    providing a correction signal to a processor in response to the wavefront error signal; and
    selectively translating the second optical element in one or more of three substantially orthogonal directions corresponding to the three orthogonal axes by at least one actuator in response to the wavefront error signal.

17. The method according to claim 16, wherein the telescope comprises a Mersenne confocal paraboloid telescope.

18. The method according to claim 16, wherein the telescope comprises a third optical element.

19. The method according to claim 16, wherein the first and the second optical elements each comprise a reflective surface.

20. The method according to claim 16, wherein the aberration is caused by atmospheric turbulence or aerodynamic boundary layer aero-optical effects, and said translating the second optical element provides a corrected output of the telescope that is substantially free of spherical, aberration, coma and astigmatism.

21. The method according to claim 16, wherein the second optical element is configured to be translated in only three orthogonal axes.

* * * * *

UNITED STATES PATENT AND TRADEMARK OFFICE
CERTIFICATE OF CORRECTION

PATENT NO. : 8,792,163 B2  
APPLICATION NO. : 12/410772  
DATED : July 29, 2014  
INVENTOR(S) : King et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this
Fourth Day of August, 2015

Michelle K. Lee
*Director of the United States Patent and Trademark Office*